United States Patent [19]

Kitamura et al.

[11] Patent Number: 5,088,106
[45] Date of Patent: Feb. 11, 1992

[54] PHASE SHIFT CIRCUIT AND REPEATER USING THE SAME

[75] Inventors: Mitsuo Kitamura, Kawasaki; Kazunori Hayami, Yokohama, both of Japan

[73] Assignee: Fujitsu Limited, Kawasaki, Japan

[21] Appl. No.: 490,911

[22] Filed: Mar. 9, 1990

[30] Foreign Application Priority Data

Mar. 16, 1989 [JP] Japan .................................. 1-64220

[51] Int. Cl.⁵ .......................................... H04L 25/20
[52] U.S. Cl. .................................... 375/4; 307/265; 307/602; 328/55
[58] Field of Search ............... 375/3, 4; 307/262, 265, 307/267, 601, 602; 328/36, 55, 58, 181, 183, 185

[56] References Cited

U.S. PATENT DOCUMENTS

| | | | |
|---|---|---|---|
| 3,693,101 | 9/1972 | Trimble | 307/602 |
| 4,370,569 | 1/1983 | Hunsinger | 307/602 |
| 4,801,827 | 1/1989 | Metz | 307/602 |
| 4,935,701 | 6/1990 | Kawai et al. | 328/55 |

FOREIGN PATENT DOCUMENTS

102855 8/1979 Japan .
264805 11/1986 Japan .

*Primary Examiner*—Benedict V. Safourek
*Attorney, Agent, or Firm*—Staas & Halsey

[57] ABSTRACT

A phase shift circuit includes a first trailing-edge elongating circuit that elongates a trailing edge of each pulse of an input clock signal so as to fall gradually and outputs a first clock signal having a first elongated fall time. A signal inversion circuit inverts the first clock signal supplied from the first trailing-edge elongating circuit and outputs an inverted version of the first clock signal. A second trailing-edge elongating circuit elongates a trailing edge of each pulse of the inverted version of the first clock signal so as to fall gradually and outputs a second clock signal having a second elongated fall time. The second clock signal is an output signal of the phase shift circuit and lags behind the input clock signal by a predetermined time based on the first and second elongated fall times. The present invention further provides a repeater which uses the above-mentioned phase shift circuit.

31 Claims, 6 Drawing Sheets

PHASE SHIFT CIRCUIT AND REPEATER USING THE SAME

BACKGROUND OF THE INVENTION

The present invention generally relates to a phase shift circuit, and more particularly to a phase shift circuit suitable for a repeater in an optical communication system, such as an optical submarine (underwater) repeater. Further, the present invention is concerned with a repeater using such a phase shift circuit.

Figure 1:
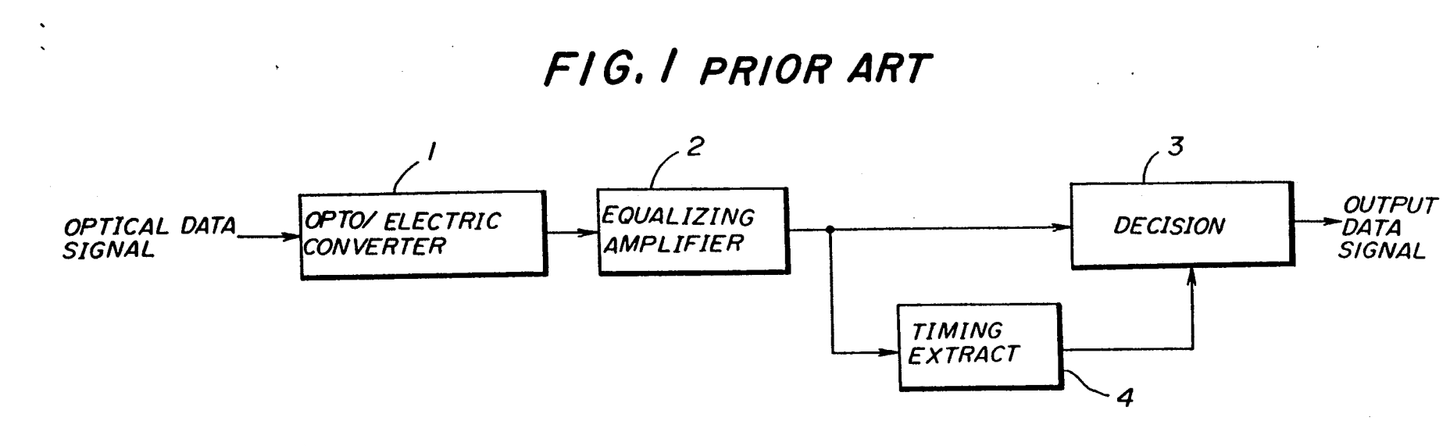
FIG. 1 is a block diagram of a conventional repeater in an optical communication system.

Phase shift circuits are widely used in various fields. A repeater in a communication system has the functions of retiming, reshaping and regenerating, and includes a phase shift circuit. Referring to FIG. 1, there is illustrated a conventional repeater used, for example, in an optical submarine communication system. An optical data signal on a transmission line is input to a opto/electric converter 1, which includes an avalanche photodiode. The opto/electric converter 1 converts the optical data signal into an electrical data signal. An equalizing amplifier 2 amplifies the electrical data signal from the opto/electric converter 1 and outputs an amplified data signal, which is applied to a decision circuit 3 and a timing extracting circuit 4. The timing extraction circuit 4 derives a clock signal from the amplified data signal supplied from the equalizing amplifier 2. The decision circuit 3 determines whether transmitted data is "1" or "0" in accordance with the clock signal from the timing extraction circuit 4. Then, an output data signal is supplied to an electrooptical converter (not shown).

Figure 2:
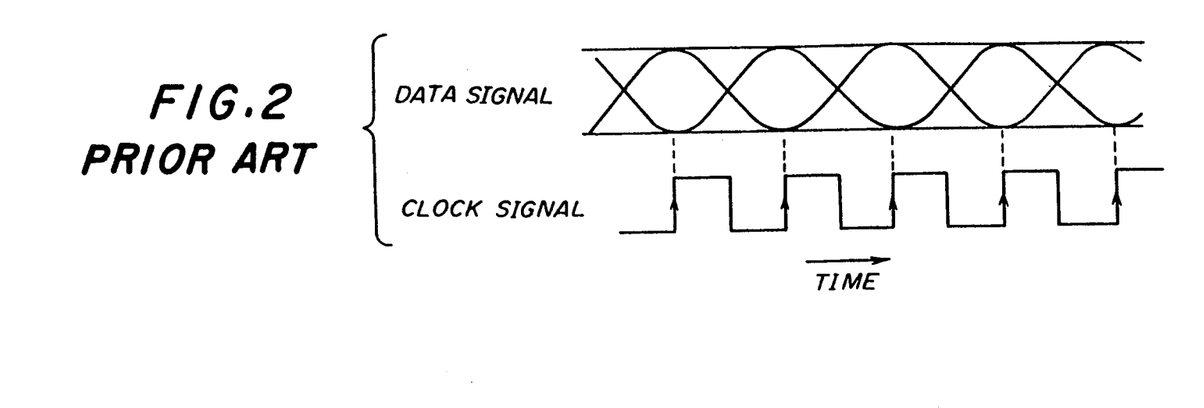
FIG. 2 is a waveform diagram illustrating how to determine whether transmitted data is a binary zero or a binary one using a clock signal extracted from an equalized signal.

As shown in FIG. 2, the decision circuit 3 makes a decision in the signal from the equalizing amplifier 2 at a timing of each rise of the clock signal from the timing extraction circuit 4. Thus, it is required that peaks of the waveform of the signal from the equalizing amplifier 2 coincide with the rises of the clock signal. For this requirement, it is necessary to adjust the phase of the clock signal.

Figure 3:
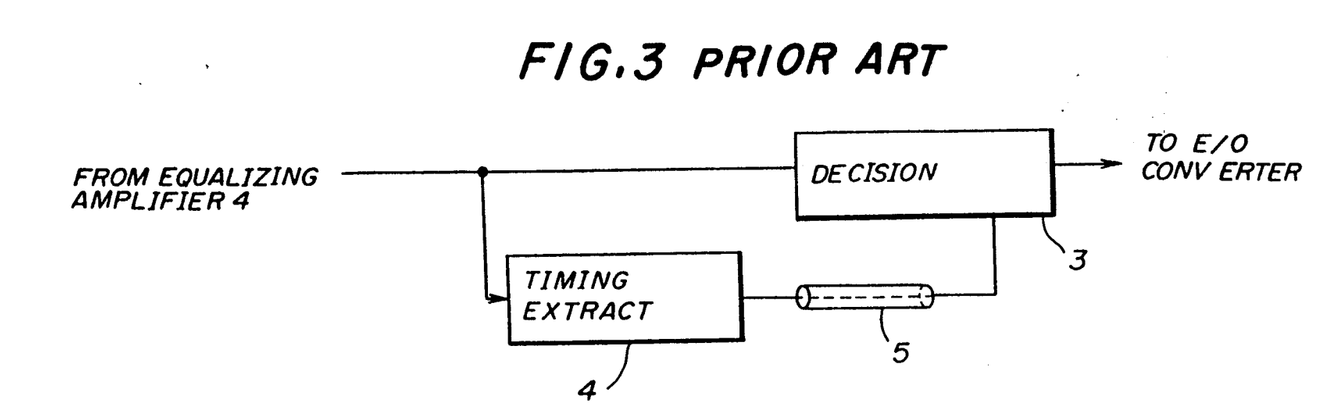
FIG. 3 is a block diagram of a conventional phase shifter applicable to the configuration shown in FIG. 1.

Referring to FIG. 3, there is illustrated a conventional phase shifter for adjusting the phase of the clock signal from the timing extraction circuit 4. The phase shifter shown in FIG. 3 is a coaxial cable line 5, which is connected between the timing extraction circuit 4 and the decision circuit 3. The length of the coaxial cable line 5 is adjusted so that the rises of the clock signal coincide with the peaks of the waveform of the signal from the equalizing amplifier 2.

Figure 4:
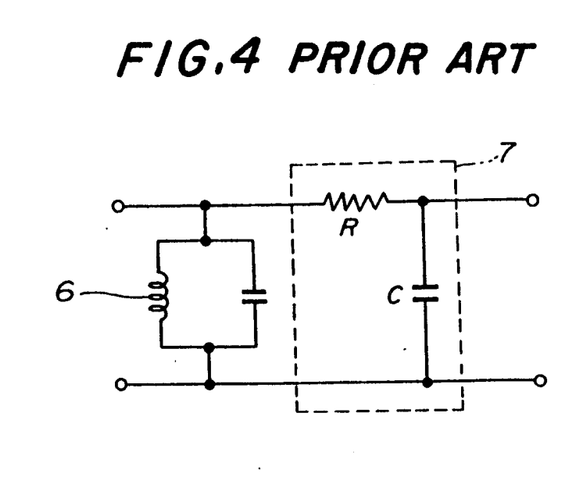
FIG. 4 is a block diagram of another conventional phase shifter applicable to the configuration shown in FIG. 1.

Another conventional phase shifter is illustrated in FIG. 4 (see Japanese Laid-Open Patent Application No. 54-102855). The phase shifter shown in FIG. 4 is composed of a resonance circuit 6 and an LC phase shifter 7. The phase of the clock signal applied to the resonance circuit 6 is adjusted by varying resistance of a resistor R or capacitance of capacitor C.

However, the use of the coaxial cable line 5 shown in FIG. 3 encounters a troublesome adjustment, and occupies a large mounting area. Additionally, it is difficult to arrange the coaxial cable line 5 together with other elements on an integrated circuit (IC) chip.

The configuration shown in FIG. 4 has the following disadvantages. It is difficult to provide the resistor R and the capacitor C on an IC chip and adjust resistance of the resistor R or capacitance of the capacitor C formed on the IC chip. Further, the signal from the resonance circuit 6 has a very small amplitude and is thus affected by noise. Generally the resistor R and the capacitor C are externally attached to the IC chip. The failure rate increases with an increase in the number of structural elements. The use of elements to be externally attached to the IC chip leads to an increased number of structural elements, which provides an increased failure rate. Moreover, it is difficult to adjust the phase of the clock signal when it has a high frequency between 400 MHz and 900 MHz, for example.

SUMMARY OF THE INVENTION

It is a general object of the present invention to provide an improved phase shift circuit in which the aforementioned disadvantages are overcome.

A more specific object of the present invention is to provide a phase shift circuit that is suitably fabricated as an IC circuit and is highly stable and reliable.

The above objects of the present invention are achieved by a phase shift circuit comprising first trailing-edge elongating means for elongating a trailing edge of each pulse of an input clock signal so as to fall gradually and for outputting a first clock signal having a first elongated fall time. A signal inverting means is coupled to the first trailing-edge elongating means for inverting the first clock signal supplied from the first trailing-edge elongating means and for outputting an inverted version of the first clock signal. A second trailing-edge elongating means is coupled to the signal inverting means for elongating a trailing edge of each pulse of the inverted version of the first clock signal so as to fall gradually and for outputting a second clock signal having a second elongated fall time. The second clock signal is an output signal of the phase shift circuit and lags behind the input clock signal by a predetermined time based on the first and second elongated fall times.

The aforementioned objects of the present invention are also achieved by a phase shift circuit comprising first trailing-edge elongating means for elongating a trailing edge of each pulse of a pair of complementary input clock signals so as to fall gradually and for outputting a first pair of complementary clock signals each having a first elongated fall time. A signal inverting means is coupled to the first trailing-edge elongating means for inverting the first pair of complementary clock signals supplied from the first trailing-edge elongating means and for outputting an inverted version of the first pair of complementary clock signals. A second trailing-edge elongating means is coupled to the signal inverting means for elongating a trailing edge of each pulse of the inverted version of the first pair of complementary clock signals so as to fall gradually and for outputting a second pair of complementary clock signals each having a second elongated fall time. The second pair of complementary clock signals is a pair of output signals of the phase shift circuit and lags behind the pair of complementary input clock signals by a predetermined time based on the first and second elongated fall times.

Another object of the present invention is to provide a repeater using the above-mentioned phase shift circuit.

This object of the present invention is achieved by a repeater provided in a communication system, comprising equalizer amplifier means for equalizing an electrical input data signal. A timing extracting means is coupled to the equalizer amplifier means for extracting a pair of complementary input clock signals from the electrical input data signal. A phase shift means is coupled to the timing extracting means for shifting a phase of the pair of complementary input clock signals and for outputting a pair of phase-shifted complementary clock signals. A decision means is coupled to the equalizer amplifier means and the phase shift means for determining whether data contained in the electrical input data signal is a binary zero or a binary one by using the pair of phase-shifted complementary clock signals and for outputting an electrical output data signal. The phase shift means includes first trailing-edge elongating means, coupled to the timing extracting means, for elongating a trailing edge of each pulse of the pair of complementary input clock signals so as to fall gradually and for outputting a first pair of complementary clock signals each having a first elongated fall time. A signal inverting means is coupled to the first trailing-edge elongating means for inverting the first pair of clock signals supplied from the first trailing-edge elongating means and for outputting an inverted version of the first pair of complementary clock signals. A second trailing-edge elongating means is coupled to the signal inverting means for elongating a trailing edge of each pulse of the inverted version of the first pair of complementary clock signals sc as to fall gradually and for outputting a second pair of complementary clock signals each having a second elongated fall time. The second pair of complementary clock signals is the pair of phase-shifted complementary signals and lags behind the pair of complementary input clock signals by a predetermined time based on the first and second elongated fall times.

Additional objects, features and advantages of the present invention will become apparent from the following detailed description when read in conjunction with the accompanying drawings.

DESCRIPTION OF THE PREFERRED EMBODIMENTS

Figure 5:
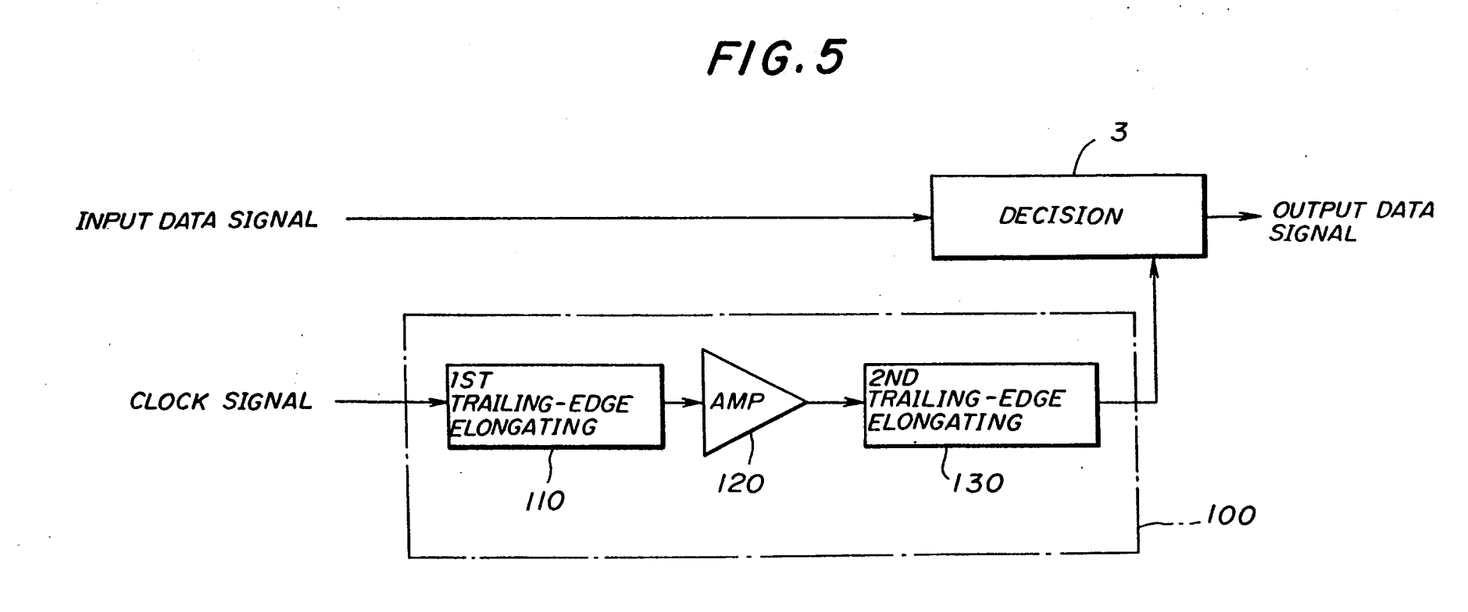
FIG. 5 is a block diagram of a phase shift circuit according to the present invention which is applied to a repeater in an optical communication system.

A description is given of a phase shift circuit according to a preferred embodiment of the present invention with reference to FIG. 5. Referring to this figure, there is illustrated a phase shift circuit 100, which is composed of a first trailing-edge elongating circuit 110, a signal inversion amplifier 120 and a second trailing-edge elongating circuit 130. The clock signal supplied from the timing extraction circuit 4 shown in FIG. 1 is input to the first trailing-edge elongating circuit 110, which elongates the trailing edge of each pulse of the clock signal so as to fall gradually so that a clock signal output therefrom has a first elongated fall time. The clock signal from the first trailing-edge elongating circuit 110 is supplied to the signal inversion amplifier 120, which generates an inverted version of the clock signal from the first trailing-edge elongating circuit 110. An output signal from the signal inversion amplifier 120 is supplied to the second trailing-edge elongating circuit 130, which elongates the trailing edge of each pulse of the inverted version so as to fall gradually so that a clock signal output therefrom has a second elongated fall time. It is noted that the trailing-edge of each pulse of the output signal from the signal inversion amplifier 120 corresponds to the leading edge of each pulse of the clock signal from the first trailing-edge elongating circuit 110. With this arrangement, it is possible to delay the clock signal supplied to the first trailing-edge elongating circuit 110 by a predetermined time based on said first and second elongated fall times. As will be described in detail later, the first elongated fall time is set equal to the second elongated fall time so that the duty ratio of the clock signal is kept identical to that of the clock signal from the second trailing-edge elongating circuit 130.

Figure 6:
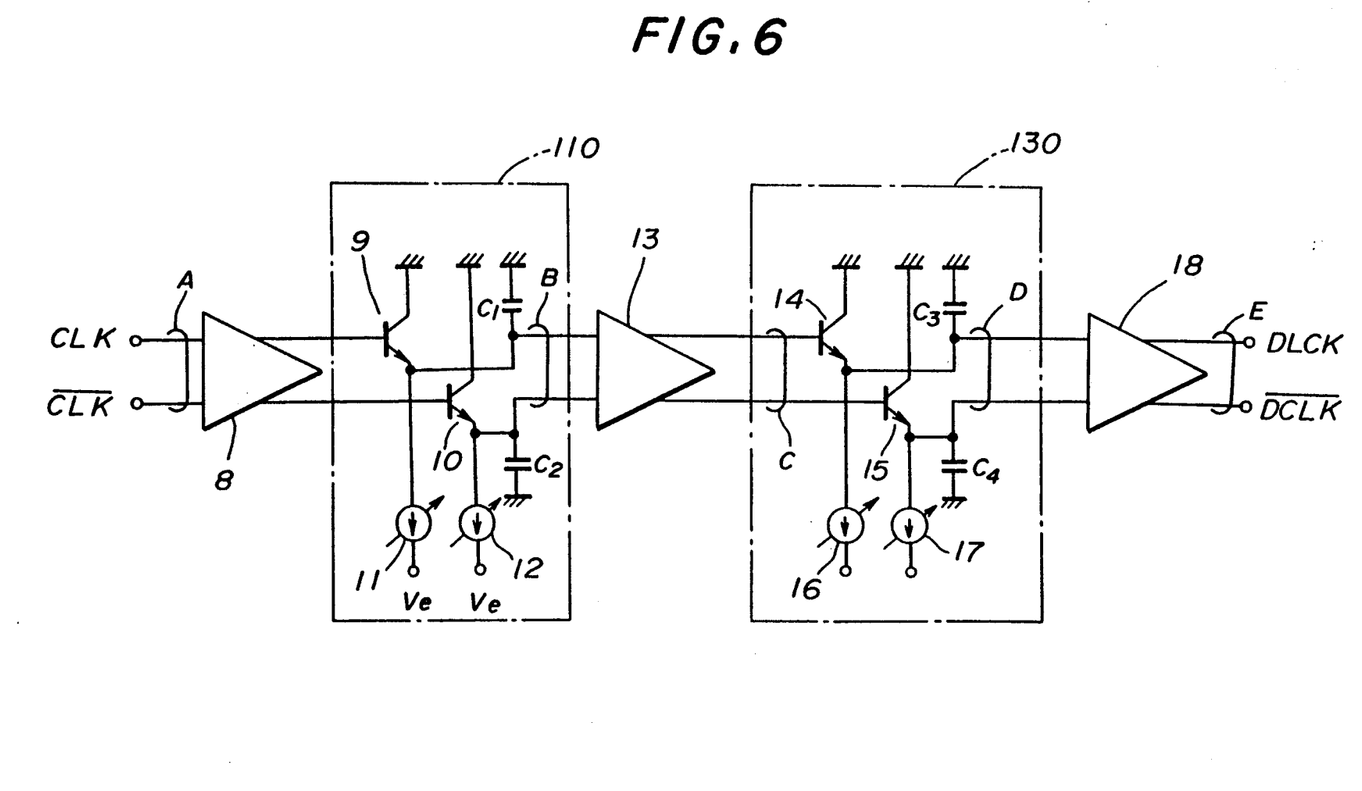
FIG. 6 is a circuit diagram of the phase shift circuit according to a preferred embodiment of the present invention.

Referring to FIG. 6, there is illustrated the phase shift circuit 100 according to a preferred embodiment of the present invention. Referring to FIG. 6, the first trailing-edge elongating circuit 110 shown in FIG. 5 is composed of two emitter-follower transistors 9 and 10, two capacitors C1 and C2, and two variable constant-current sources 11 and 12. A differential amplifier 8 serving as a buffer amplifier is provided on the input side of the first trailing-edge elongating circuit 110. In most of cases, the timing extraction circuit 4 generates a pair of complementary clock signals having mutually opposite polarities so that the circuit can be formed symmetrically and can operate with high stability. In FIG. 6, two clock signals CLK and $\overline{CLK}$ are applied to the differential amplifier 8, which outputs amplified clock signals. The amplified clock signal CLK is applied to the base of the transistor 9, and the amplified clock signal $\overline{CLK}$ is applied to the base of the transistor 10. The collectors of the transistors 9 and 10 are grounded. The capacitor C1 is connected between the emitter of the transistor 9 and the ground (serving as a positive power source). Similarly, the capacitor C2 is connected between the emitter of the transistor 10 and the ground. The variable constant-current source 11 is connected between the emitter of the transistor 9 and a negative power source Ve. The variable constant-current source 12 is connected between the emitter of the transistor 10 and the negative power source Ve.

The emitters of the transistors 9 and 10 are connected to two input terminals of a signal inversion amplifier 13, which corresponds to the signal inversion amplifier 120 in FIG. 5. The signal inversion amplifier 13 generates a pair of inverted versions of the clock signals from the transistors 9 and 10.

The second trailing-edge elongating circuit 130 shown in FIG. 5 is made up of two emitter follower transistors 14 and 15, two variable constant-current sources 16 and 17 and two capacitors C3 and C4. A waveform shaping amplifier 18 follows the second trailing-edge elongating circuit 130. One of the inverted versions of the clock signals from the signal inversion amplifier 13 is applied to the gate of the transistor 14, and the other inverted version is applied to the gate of the transistor 15. The collectors of the transistors 14 and 15 are grounded. The capacitors C3 and C4 are connected between the ground and the emitters of the transistors 14 and 15, respectively. The variable constant-current sources 16 and 17 are connected between the negative power source Ve and the emitters of the transistors 14 and 15, respectively. The emitters of the transistors 14 and 15 are connected to input terminals of the waveform shaping amplifier 18, which outputs a pair of delayed clock signals DCLK and $\overline{DCLK}$ through output terminals.

Figure 7:
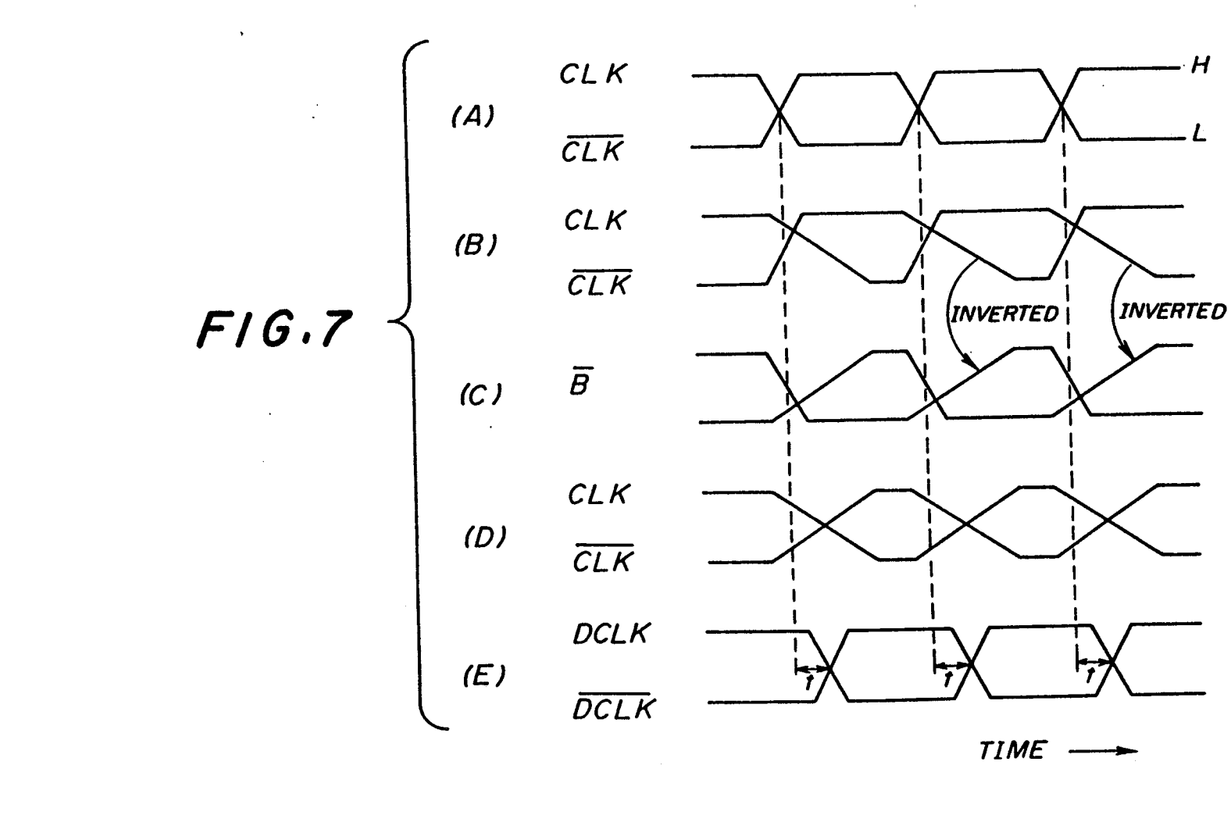
FIG. 7 is a waveform diagram of signals observed at parts of the configuration shown in FIG. 6.

A description is given of the operation of the phase shift circuit shown in FIG. 6 with reference to FIG. 7. Waveforms shown in (A) through (E) are obtained at portions A through E shown in FIG. 6, respectively. The clock signals CLK and $\overline{CLK}$ having waveforms shown in FIG. 7(A) is input to the differential amplifier 8. When the clock signal CLK switches from a low level (L) to a high level (H), the transistor 9 is turned ON rapidly. That is, the potential of the emitter of the transistor 9 increases to the ground level rapidly due to the function of the emitter follower connection of the transistor 9. When the clock signal CLK changes from the high level to the low level, the transistor 9 is turned OFF. The capacitor C1 is gradually discharged through the variable constant-current source 11 so that the emitter potential of the transistor 9 is gradually decreased as shown in FIG. 7(B). That is, the trailing edge of each pulse of the clock signal falls with a delay (the fall time is elongated). The amount of delay is adjustable by varying a constant current that passes through the variable constant-current source 11. When the variable-current source 11 is adjusted so as to pass a large amount of current, the trailing edge of each pulse falls with a small delay. On the other hand, when the variable-current source 11 is adjusted so as to pass a small amount of current, the trailing edge of each pulse falls with a large delay. The trailing edge of each pulse of the clock signal $\overline{CLK}$ falls with a delay in the same way as shown in FIG. 7(B).

The clock signals CLK and $\overline{CLK}$ are inverted by the signal inversion amplifier 13, which outputs inverted version of the clock signals shown in FIG. 7(C). When the clock signal applied to the base of the transistor 14 increases to the high level, the emitter thereof is increased to the high level rapidly. When the clock signal applied to the base of the transistor 14 changes from the high level to the low level, the transistor 14 is turned OFF. The capacitor C3 is discharged gradually through the variable constant-current source 16 so that the trailing edge of each pulse of the clock signal applied to the base of the transistor 14 falls with a delay. The amount of delay depends on the amount of a constant current which passes through the variable constant-current source 16. The trailing edge of each pulse of the clock signal applied to the base of the transistor 15 falls with a delay in the same way as shown in FIG. 7(D).

The waveforms of the clock signals shown in FIG. 7 (D) are shaped by the waveform shaping amplifier 18, which a pair of complementary outputs clock signals DCLK and $\overline{DCLK}$ having waveforms shown in FIG. 7 (E). The waveform shaping amplifier 18 rises the output signals to the high level when the input signals exceed a predetermined threshold level, and falls the output signals to the low level when the input signals become less than a predetermined threshold level. As shown in FIG. 7 (A) and (E), the clock signals CLK and $\overline{CLK}$ applied to the differential amplifier 8 are delayed by a time t so that two delayed clock signals DCLK and $\overline{DCLK}$ are generated while keeping the duty ratio thereof fixed. In order to keep the duty ratio fixed, the delay amount provided by the first trailing-edge elongating circuit 110 (FIG. 5) is set equal to that by the second trailing-edge elongating circuit 130 (FIG. 5). In term of the principle of the configuration shown in FIG. 6, it is possible to omit a portion relating to the clock signal $\overline{CLK}$ so that a simplified configuration is formed. However, as described before, the configuration shown in FIG. 6 is preferable to the simplified configuration. Each of the variable constant-current sources 11, 12, 16 and 17 can be formed by a conventional variable constant-current source.

It should be appreciated that the configuration shown in FIG. 6 can be realized by an IC circuit. An IC chip having the circuit shown in FIG. 6 is provided with terminals for adjusting the variable constant-current sources 11, 12, 16 and 17. It is easy to adjust the variable constant-current sources 11, 12, 16 and 17 through the terminals. The circuit shown in FIG. 6 is suitable for operating at a high frequency between 400 MHz and 900 MHz. Since all the structural elements of the circuit shown in FIG. 6 can be integrated on a chip, the circuit can process the clock signal having such a high frequency with high stability. For the same reason, the failure rate of the circuit shown in FIG. 6 is less than that of the configuration shown in FIG. 4. It is noted that the IC chip realizing the phase shift circuit shown in FIG. 6 can be considered as a single element. Thus, the circuit in FIG. 6 has high reliability. From the above-mentioned points of view, the phase shift circuit according to the present invention is particularly suitable for realizing a submarine repeater in an optical communication system.

Figure 8:
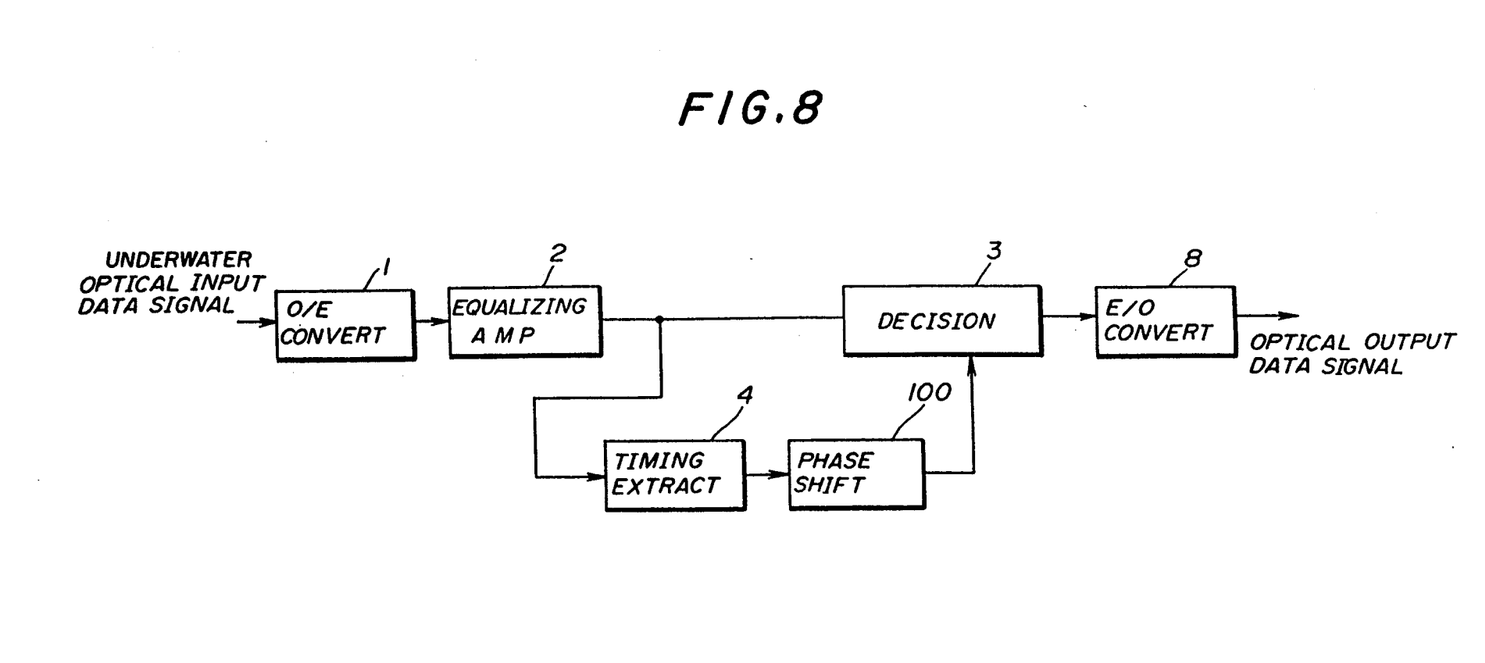
FIG. 8 is a block diagram of a repeater according to the present invention.

FIG. 8 is a block diagram of a repeater which employs the phase shift circuit shown in FIG. 6. In FIG. 8, those parts which are the same as those shown in the previous figures are given the same reference numerals. The phase shift circuit 100 is the same as shown in FIGS. 5 and 6. The decision circuit 3 outputs a decided signal or regenerated signal, which is input to an electrooptical converter 8. The regenerated signal converts the regenerated signal into an optical data signal, which is sent to a transmission line.

The present invention is not limited to the specifically described embodiments, and variations and modifications may be made without departing from the scope of the present invention.

What is claimed is:
1. A phase shift circuit, comprising:
first trailing-edge elongating means for elongating a trailing edge of each pulse of an input clock signal so as to fall gradually and for outputting a first clock signal having a first elongated fall time;
signal inverting means, coupled to said first trailing-edge elongating means, for inverting the first clock signal supplied from said first trailing-edge elongating means and for outputting an inverted version of the first clock signal; and
second trailing-edge elongating means, coupled to said signal inverting means, for elongating a trailing edge of each pulse of the inverted version of the first clock signal so as to fall gradually and for outputting a second clock signal having a second elongated fall time, the second clock signal lagging behind the input clock signal by a predetermined time based on the first and second elongated fall times; and wherein said first trailing-edge elongated means is operatively connected to positive and negative power sources and comprises:
  a first emitter follower transistor having a base supplied with the input clock signal, a collector coupled to the positive power source, and an emitter through which the first clock signal is output;
  a first capacitor coupled between the positive power source and the emitter of said first emitter follower transistor; and
  a first variable constant-current supplying means, coupled between the emitter of said first emitter follower transistor and the negative power source, for supplying a first variable constant-current passing therethrough from said first capacitor, the first elongated fall time being adjusted by the first variable constant-current passing through said first variable constant-current supplying means, and wherein said second trailing-edge elongating means comprises:
  a second emitter follower transistor having a base supplied with the inverted versions of said first clock signal, a collector coupled to the positive power source, and an emitter through which the second clock signal is output;
  a second variable constant-current supplying means, coupled between the emitter of said second emitter follower transistor and the negative power source, for supplying a second variable constant-current passing therethrough from said second capacitor, the second elongated fall being adjusted by the second variable constant-current passing through said second variable constant-current supplying means.

2. A phase shift circuit as claimed in claim 1, wherein the first elongated fall time is substantially equal to the second elongated fall time, and wherein said phase shift circuit further comprises waveform shaping means, coupled to said second trailing-edge elongating means, for shaping a waveform of the second clock signal into a rectangular shape and for outputting a waveshaped clock signal which lags behind said input clock signal by the predetermined time and which has a duty ratio identical to that of the input clock signal.

3. A phase shift circuit as claimed in claim 1, wherein said phase shift circuit is provided in a repeater of a communication system and the input clock signal is extracted from a data signal supplied to said repeater.

4. A phase shift circuit, comprising:
  first trailing-edge elongating means for elongating a trailing edge of each pulse of a pair of complementary input clock signals so as to fall gradually and for outputting a first pair of complementary clock signals each having a first elongated fall time;
  signal inverting means, coupled to said first trailing-edge elongating means, for inverting the first pair of complementary clock signals supplied from said first trailing edge elongating means and for outputting an inverted version of the first pair of complementary clock signals; and
  second trailing-edge elongating means, coupled to said signal inverting means, for elongating a trailing edge of each pulse of the inverted version of the first pair of complementary clock signals so as to fall gradually and for outputting a second pair of complementary clock signals each having a second elongated fall time, the second pair of complementary clock signals lagging behind the pair of complementary input clock signals by a predetermined time based on the first and second elongated fall times; and wherein said first trailing-edge elongating means is operatively connected to positive and negative power sources and comprises:
  a pair of emitter follower transistors each having a base supplied with a corresponding one of the pair of complementary input clock signals, a collector coupled to the positive power source, an emitter through which a corresponding one of the first pair of complementary clock signals is output;
  a pair of capacitors each coupled between the positive power source and the emitter of a corresponding one of the pair of emitter follower transistors; and
  a pair of variable constant-current supplying means, each coupled to the emitter of a corresponding one of the pair of emitter follower transistors and the negative power source, for supplying a first variable constant-current passing through a corresponding one of the pair of variable constant-current supplying means from a corresponding one of said pair of capacitors,
  said first elongated fall time being adjusted by a corresponding one of the variable constant-currents passing through said pair of variable constant-current supplying means.

5. A phase shift circuit as claimed in claim 4, wherein the first elongated fall time is substantially equal to the second elongated fall time.

6. A phase shifting circuit as claimed in claim 4, further comprising waveforms shaping means, coupled to said second trailing-edge elongating means, for shaping each of the second pair of complementary clock signals into a rectangular waveform and for outputting a pair of waveshaped complementary clock signals which lag behind said pair of complementary input clock signals by the predetermined time.

7. A phase shift circuit as claimed in claim 4, further comprising differential amplifying means for receiving a pair of original complementary input clock signals from an external circuit and for deriving the pair of complementary input clock signals from the pair of original complementary input clock signals.

8. A phase shift circuit as claimed in claim 4, wherein said first-trailing edge elongating means, said signal inverting means and said second trailing-edge elongating means are formed on a semiconductor chip.

9. A phase shift inverter as claimed in claim 4, wherein said phase shift circuit is provided in a repeater of a communication system and said pair of complementary input clock signals is extracted from a data signal supplied to said repeater.

10. A phase shift inverter as claimed in claim 4, wherein the pair of complementary input clock signals has a frequency between approximately 400 MHz and approximately 900 MHz.

11. A phase shift circuit, comprising:
  first trailing-edge elongating means for elongating a trailing edge of each pulse of a pair of complementary input clock signals so as to fall gradually and for outputting a first pair of complementary clock signals each having a first elongated fall time;

signal inverting means, coupled to said first trailing-edge elongating means, for inverting the first pair of complementary clock signals supplied from said first trailing edge elongating means and for outputting an inverted version of the first pair of complementary clock signals; and second trailing-edge elongating means, coupled to said signal inverting means, for elongating a trailing edge of each pulse of the inverted version of the first pair of complementary clock signals so as to fall gradually and for outputting a second pair of complementary clock signals each having a second elongated fall time, the second pair of complementary clock signals lagging behind the pair of complementary input clock signals by a predetermined time based on the first and second elongated fall times; and wherein said second trailing-edge elongating means is operatively connected to positive and negative power sources and comprises:

a pair of emitter follower transistors each having a base supplied with a corresponding one of the inverted version of the first pair of complementary clock signals, a collector coupled to the positive power source, an emitter through which a corresponding one of the second pair of complementary clock signals is output;

a pair of capacitors each coupled between the positive power source and the emitter of a corresponding one of said pair of emitter follower transistors; and a pair of variable constant-current supplying means, each coupled to the emitter of a corresponding one of said pair of emitter follower transistors and the negative power source, for supplying a second variable constant-current passing through a corresponding one of said pair of variable constant-current supplying means from a corresponding one of said pair of capacitors, said second elongated fall time being adjusted by a corresponding one of the variable constant-currents passing through said pair of variable constant-current supplying means.

12. A phase shift circuit as claimed in claim 11, wherein the first elongated fall time is substantially equal to the second elongated fall time.

13. A phase shifting circuit as claimed in claim 11, further comprising waveforms shaping means, coupled to said second trailing-edge elongating means, for shaping each of the second pair of complementary clock signals into a rectangular waveform and for outputting a pair of waveshaped complementary clock signals which lag behind said pair of complementary input clock signals by the predetermined time.

14. A phase shift circuit as claimed in claim 11, further comprising differential amplifying means for receiving a pair of original complementary input clock signals from an external circuit and for deriving the pair of complementary input clock signals from the pair of original complementary input clock signals.

15. A phase shift circuit as claimed in claim 11, wherein said first trailing-edge elongating means, said signal inverting means and said second trailing-edge elongating means are formed on a semiconductor chip.

16. A phase shift circuit as claimed in claim 11, wherein said phase shift circuit is provided in a repeater of a communication system and said pair of complementary input clock signals is extracted from a data signal supplied to said repeater.

17. A phase shift circuit as claimed in claim 7, wherein the pair of complementary input clock signals has a frequency between approximately 400 MHz and approximately 900 MHz.

18. A repeater provided in a communication system, comprising:

equalizer amplifier means for equalizing an electrical input data signal;

timing extracting means, coupled to said equalizer amplifier means, for extracting a pair of complementary input clock signals from the electrical input data signal;

phase shift means, coupled to said timing extracting means, for shifting a phase of the pair of complementary input clock signals and for outputting a pair of phase-shifted complementary clock signals;

decision means, coupled to said equalizer amplifier means and said phase means, for determining whether data contained in the electrical input data signal is a binary zero or a binary one by using the pair of phase-shifted complementary clock signals and for outputting an electrical output data signal;

wherein said phase shift means includes:

first trailing-edge elongating means, coupled to said timing extracting means, for elongating a trailing edge of each pulse of the pair of complementary input clock signals so as to fall gradually and for outputting a first pair of complementary clock signals each having a first elongated fall time;

signal inverting means coupled to said first trailing-edge elongating means, for inverting the first pair of clock signals supplied from said first trailing-edge elongating means and for outputting an inverted version of the first pair of complementary clock signals; and second trailing-edge elongating means, coupled to said signal inverting means, for elongating a trailing edge of each pulse of the inverted version of the first pair of complementary clock signals so as to fall gradually and for outputting a second pair of complementary clock signals each having a second elongated fall time, the second pair of complementary clock signals providing the pair of phase-shifted complementary signals and lagging behind the pair of complementary input clock signals by a predetermined time based on the first and second elongated fall times;

wherein said first trailing-edge elongating means is operatively connected to positive and negative power sources and comprises:

a pair of emitter follower transistors each having a base supplied with a corresponding one of the pair of complementary input clock signals, a collector coupled to the positive power source, an emitter through which a corresponding one of the first pair of complementary clock signals;

a pair of capacitors each coupled between said positive power source and the emitter of a corresponding one of said pair of emitter follower transistors; and a pair of variable constant-current supplying means, each coupled to the emitter of a corresponding one of said pair of emitter follower transistors and the negative power source, for supplying a variable constant-current passing through a corresponding one of said pair of variable constant-current supplying means from a corresponding one of said pair of capacitors, the elongated fall of each of said pair of complementary clock signals being adjusted by a corresponding one of the variable constant-currents passing through said pair of variable constant-current supplying means.

19. A repeater as claimed in claim 18, wherein the first elongated fall time is substantially equal to the second elongated fall time.

20. A repeater as claimed in claim 18, wherein said phase shift means comprises waveform shaping means coupled to said second trailing-edge elongating means, for shaping each of the second pair of complementary clock signals into a rectangular waveform and for outputting a pair of waveshaped complementary clock signals which lags behind the pair of complementary input clock signals by the predetermined time and are supplied to said decision means.

21. A repeater as claimed in claim 18, further comprising differential amplifying means for receiving the pair of complementary input clock signals and for amplifying the pair of complementary input clock signals to thereby output an amplified pair of complementary input clock signals to be supplied to said first trailing-edge elongating means.

22. A repeater as claimed in claim 18, further comprising:
  first converter means, followed by said equalizing amplifier means, for receiving an optical input signal from an optical transmission line and converting the optical signal into the electrical input data signal; and
  second converter means, coupled to said decision means, for receiving the electrical output data signal from said decision means and for converting said electrical output data signal into an optical output signal to be transmitted to an optical transmission line.

23. A repeater as claimed in claim 18, wherein said repeater is used in an optical underwater communication system.

24. A repeater as claimed in claim 18, wherein the pair of complementary input clock signals has a frequency between approximately 400 MHz and approximately 900 MHz.

25. A repeater provided in a communication system, comprising:
  equalizer amplifier means for equalizing an electrical input data signal;
  timing extracting means, coupled to said equalizer amplifier means, for extracting a pair of complementary input clock signals from the electrical input data signal;
  phase shift means, coupled to said timing extracting means, for shifting a phase of the pair of complementary input clock signals and for outputting a pair of phase-shifted complementary clock signals; and
  decision means, coupled to said equalizer amplifier means and said phase shift means, for determining whether data contained in the electrical input data signal is a binary zero of a binary one by using the pair of phase-shifted complementary clock signals and for outputting an electrical output data signal;

wherein the phase shift means includes:
  firs trailing-edge elongating means, coupled to said timing extracting means, for elongating a trailing edge of each pulse of the pair of complementary input clock signals so as to fall gradually and for outputting a first pair of complementary clock signals each having a first elongated fall time;
  signal inverting means coupled to said first trailing-edge elongating means, for inverting the first pair of clock signals supplied from said first trailing-edge elongating means and for outputting an inverted version of the first pair of complementary clock signals; and
  second trailing-edge elongating means, coupled to said signal inverting means, for elongating a trailing edge of each pulse of the inverted version of the first pair of complementary clock signals so as to fall gradually and for outputting a second pair of complementary clock signals each having a second elongating fall time, the second pair of complementary clock signals providing the pair of phase-shifted complementary signals and lagging behind the pair of complementary input clock signals by a predetermined time based on the first and second elongated fall times; and wherein said second trailing-edge elongating means is operatively connected to positive and negative power sources and comprises:
  a pair of emitter follower transistors each having a base supplied with a corresponding one of the inverted version of the first pair of complementary clock signals, a collector coupled to the positive power source, an emitter through which a corresponding one of the second pair of complementary clock signals is output;
  a pair of capacitors each coupled between the position power source and the emitter of a corresponding one of said pair of emitter follower transistors; and
  a pair of variable constant-current supplying means, each coupled to the emitter of a corresponding one of said pair of emitter follower transistors and the negative power source, for supplying a variable constant-current passing through a corresponding one of said pair of variable constant-current supplying means from a corresponding one of said pair of capacitors, the elongated fall of each of the second pair of complementary clock signals being adjusted by a corresponding one of the variable constant-currents passing through said pair of variable constant-current supplying means.

26. A repeater as claimed in claim 25, wherein the first elongated fall time is substantially equal to the second elongated fall time.

27. A repeater as claimed in claim 25, wherein said phase shift means comprises waveform shaping means coupled to said second trailing-edge elongating means, for shaping each of the second pair of complementary clock signals into a rectangular waveform and for outputting a pair of waveshaped complementary clock signals which lags behind the pair of complementary input clock signals by the predetermined time and are supplied to said decision means.

28. A repeater as claimed in claim 25, further comprising differential amplifying means for receiving the pair of complementary input clock signals and for amplifying the pair of complementary input clock signals to thereby output an amplified pair of complementary input clock signals to be supplied to said first trailing-edge elongating means.

29. A repeater as claimed in claim 25, further comprising:
   first converter means, followed by said equalizing amplifier means, for receiving an optical input signal from an optical transmission line and converting the optical signal into the electrical input data signal; and
   second converter means, coupled to said decision means, for receiving the electrical output data signal from said decision means and for converting said electrical output data signal into an optical output signal to be transmitted to an optical transmission line.

30. A repeater as claimed in claim 25, wherein said repeater is used in an optical underwater communication system.

31. A repeater as claimed in claim 25, wherein the pair of complementary input clock signals has a frequency between approximately 400 MHz and approximately 900 MHz.

* * * * *